(12) United States Patent
Paik et al.

(10) Patent No.: US 6,862,261 B2
(45) Date of Patent: Mar. 1, 2005

(54) ZIPPER TYPE VDSL SYSTEM

(75) Inventors: Jong-Ho Paik, Kyungki-do (KR);
Young-Hwan You, Seoul (KR);
Jin-Woong Cho, Kyungki-do (KR);
Won-Young Yang, Seoul (KR);
Yong-Soo Cho, Seoul (KR)

(73) Assignee: Korea Electronics Technology Institute, Pyeongtaek (KR)

( * ) Notice: Subject to any disclaimer, the term of this patent is extended or adjusted under 35 U.S.C. 154(b) by 748 days.

(21) Appl. No.: 09/728,141

(22) Filed: Dec. 1, 2000

(65) Prior Publication Data

US 2002/0064219 A1 May 30, 2002

(30) Foreign Application Priority Data

Oct. 5, 2000 (KR) .......................................... 2000-58444

(51) Int. Cl.[7] ................................................. H04S 11/00
(52) U.S. Cl. ....................... 370/208; 370/210; 375/222; 375/377
(58) Field of Search ................................. 370/203, 204, 370/205, 206, 208, 209, 210, 480, 485, 465; 375/219, 222, 285, 296, 295, 260, 230, 232, 377; 379/93.01

(56) References Cited

U.S. PATENT DOCUMENTS

| | | | | |
|---|---|---|---|---|
| 6,181,714 B1 | * | 1/2001 | Isaksson et al. | 370/491 |
| 6,185,251 B1 | * | 2/2001 | Fertner | 375/231 |
| 6,307,889 B1 | * | 10/2001 | Chun | 375/260 |
| 6,320,901 B1 | * | 11/2001 | Arad et al. | 375/222 |
| 6,320,903 B1 | * | 11/2001 | Isaksson et al. | 375/232 |
| 6,408,022 B1 | * | 6/2002 | Fertner | 375/230 |
| 6,590,893 B1 | * | 7/2003 | Hwang et al. | 370/354 |
| 6,687,307 B1 | * | 2/2004 | Anikhindi et al. | 375/260 |

* cited by examiner

Primary Examiner—Bob A. Phunkulh
(74) Attorney, Agent, or Firm—Alston & Bird LLP

(57) ABSTRACT

Disclosed is a zipper type Very high bit-rate Digital Subscriber Line (VDSL) system which comprises a transmitter including an inverse fast Fourier transformer for performing an inverse fast Fourier transform on input data, and a cyclic extension adder for adding a cyclic extension for each symbol to the data output from the inverse fast Fourier transformer and outputting the data to a transmission channel; and a receiver including a cyclic extension remover for removing the cyclic extension from the data received through the transmission channel, and a fast Fourier transformer for performing a fast Fourier transform on the data output from the cyclic extension remover. The cyclic extension adder copies a first predetermined number of data starting from the leading part of the input symbol data received from the inverse fast Fourier transformer into a first cyclic suffix for removing interference between symbols and maintaining orthogonality between sub-carriers; adds the first cyclic suffix to the end of the symbol data; copies a second predetermined number of data subsequent to the first predetermined number of data into a second cyclic suffix for maintaining orthogonality between upstream and downstream; and adds the second cyclic suffix to the end of the first cyclic suffix.

9 Claims, 7 Drawing Sheets

(PRIOR ART)

(PRIOR ART)

ZIPPER TYPE VDSL SYSTEM

BACKGROUND OF THE INVENTION (a) Field of the Invention

The present invention relates to a VDSL (Very high bit-rate Digital Subscriber Line) system. More specifically, the present invention relates to a zipper type VDSL system providing efficient cyclic extension.

(b) Description of the Related Art

Generally, in the zipper system, a cyclic prefix (hereinafter referred to as "CP") and a cyclic suffix (hereinafter referred to as "CS") are added to a block called discrete multi-tone (hereinafter referred to as "DMT").

The CP is inserted in order to prevent interference between symbols and between subchannels, and the CS is to maintain orthogonality between upstream and downstream sub-carriers. Thus insertion of both CP and CS into the DMT secures prevention of near-end cross talk (hereinafter referred to as "NEXT").

Such a zipper system may be regarded as an extended form of the DMT system in two aspects as follows: (1) the subchannels are dynamically allocated adequately to a required bit rate for upstream and downstream, which allows the system to share the upstream and downstream with other systems such as ADSL (Asymmetric Digital Subscriber Line) in a single binder, making it easier to use the system; and (2) as well as the CP, the CS is added to the end of the signal so as to prevent NEXT.

As shown in FIG. 1, the NEXT signal is received in a short time from an adjacent network terminal but a desired signal is delayed by $\Delta$, which depends on the length of the channel.

If not in ideal circumstances, upstream and downstream signals using distinct sub-carriers may affect each other because they fail to maintain orthogonality with the NEXT signal due to the channel delay $\Delta$.

For that reason, the zipper system adds the CS to the end of the DMT frame in order to maintain orthogonality with the NEXT signal.

Contrary to CP, the CS copies the leading part of a desired signal and it is added to the end of the signal. Adding the CS allows the signal to maintain orthogonality with the NEXT signal and thereby makes it possible to fully restore a transmission signal from a received one at the reception terminal.

The latency generally varies depending on the length of the channel, and thus, in the synchronous mode, the channel of the longest latency in the single binder determines the length of the CS.

Unlike the synchronous mode in which all frames in the binder to be transmitted are synchronized with one another, the asynchronous mode causes a network terminal to transmit signals at any time and fails to maintain orthogonality between upstream and downstream.

To overcome the problem, in the asynchronous mode, a pulse shaping function at the transmission terminal and a windowing function at the reception terminal are effected to minimize spreading of signals out of given upstream and downstream bands.

The windowing function also reduces the sidelobe of radio frequency interference (RFI) introduced in the system.

Compared to the synchronous mode, the asynchronous zipper system is more efficient because the length of CS is adjustable depending on the latency of the individual channels.

FIG. 2 is a diagram explaining pulse shaping and windowing functions for a DMT symbol in the conventional zipper system.

As shown in FIG. 2, the asynchronous zipper system mainly uses a raised-cosine window in order to maintain orthogonality of signals.

The term "latency" as used herein indicates a maximum time required for one bit to be fed into the transmission terminal and be output at the reception terminal. In the zipper system, latency is given by the following equation:

$$\tau_{Zipper} = \Delta + (2(2N + N_{CP}) + N_{CS})/f_s$$

In the equation, $\Delta$ represents the latency caused by the channel, N the number of subchannels, $N_{CP}$ the length of the CP, $N_{CS}$ the length of the CS, and $f_s$ the sampling frequency.

The efficiency of the zipper system is also given by:

$$\delta_{Zipper} = \frac{2N}{2N + N_{CP} + N_{CS}}$$

Table 1 shows the efficiency and latency of a zipper system with the length of the channel being 1,500 m, $N_{CP}$ 60 samples, $N_{CS}$ 150 samples, and $f_s$ 20 MHz.

TABLE 1

Efficiency and latency of zipper type VDSL system.

| No. of subchannels | Efficiency | Latency |
|---|---|---|
| 256 | 70.9% | 72 μs |
| 1024 | 90.7% | 226 μs |
| 4096 | 97.5% | 840 μs |

As is apparent from Table 1, the efficiency increases with a larger number of subchannels and the latency is much smaller compared to that of the (?) type VDSL system such as SDMT.

FIG. 3 is a schematic block diagram of the conventional zipper type VDSL system.

As shown in FIG. 3, the conventional zipper type VDSL system comprises: a transmitter 10 including an Inverse Fast Fourier Transform (hereinafter referred to as "IFFT") unit 12 for performing an IFFT on input signals, and a cyclic extension adder 14 for adding the CP and CS to the signals transformed by the IFFT unit 12; a receiver 20 including a cyclic extension remover 22 for removing the CP and CS from the signals output from the transmitter 10, and an FFT unit 24 for performing an FFT on the signals output from the cyclic extension remover 22; and a transmission channel 30 for exchanging the signals between the transmitter 10 and the receiver 20.

Various components other than the above-mentioned ones may be included in the transmitter 10 and the receiver 20 of the conventional zipper type VDSL system and will not be described in further detail.

Also, a description will be given on the assumption that the signal symbol processed at the cyclic extension adder 14 and the cyclic extension remover 22 is composed of 2N effective data, $N_{CP}$ CP's, and $N_{CS}$ CS's.

The CP is used to prevent the previous symbol transmitted on a channel with a memory from being damaged by the current symbol and, as illustrated in FIG. 4, copies the ending part of the symbol in the time domain to maintain the circular form of the effective data.

In this regard, a part of the symbol to be copied into the CP is later than its inserting position and thus the previous input signal must be stored before an input of the next signal.

The CS is used to remove the NEXT, and contrary to the CP, copies the leading part of the symbol.

After insertion of the cyclic extension at the cyclic extension adder 14, the received signal is expressed by:

$$\tilde{x}_l(\tilde{n}) = \frac{1}{\sqrt{2N}} \sum_{k=0}^{2N-1} X_l(k) e^{\frac{j2\pi k \tilde{n}}{2N}}$$

Here, $\tilde{n} = -N_{CP}, -N_{CP}+1, \ldots, 2N+N_{CS}-1$ and $X_l$ is transmitted data symbol.

The signal received through the transmission channel 30 generally contains phase jitter and timing offset added at the sampler and is thus given by:

$$\tilde{y}_l(\tilde{n}) = \frac{1}{\sqrt{2N}} \sum_{k=0}^{2N-1} X_l(k) H_l(k) e^{\frac{j2\pi k(\tilde{n}+\delta)}{2N}} + \tilde{w}_l(\tilde{n})$$

Here, $\delta$ is a normalized timing offset and $H_l(k)$ is the l'th channel frequency response and $\tilde{w}_l$ is the additive noise.

Due to interference between adjacent symbols while passing through the transmission channel 30, the signal distorted by the channel is received at the cyclic extension remover 22 of the receiver 20.

The distorted CP's signal is removed at the cyclic extension remover 22 to extract 2N effective data not affected by the interference between the symbols, and then demodulated at the FFT unit 24. This demodulated signal is given by:

$$\tilde{y}_l(\tilde{n}) = \frac{1}{\sqrt{2N}} \sum_{k=0}^{2N-1} X_l(k) H_l(k) e^{\frac{j2\pi k(n+\delta)}{2N}} + \tilde{w}_l(n) \quad (1)$$

$$\tilde{Y}_l(k) = \frac{1}{\sqrt{2N}} \sum_{k=0}^{2N-1} \tilde{y}_l(n) e^{\frac{-j2\pi nk}{2N}}$$

$$= X_l(k) H_l(k) e^{\frac{j2\pi \delta k}{2N}} + \tilde{W}_l(k)$$

Here, $n = 0, 1, 2, \ldots, 2N-1$, and $k = 0, 1, 2, \ldots, 2N-1$.

FIG. 5 is a block diagram of a CP adding unit in the cyclic extension adder 14 of the conventional zipper type VDSL system.

As shown in FIG. 5, the CP adding unit of the cyclic extension adder 14 includes 2N buffers 141, 143 and 145 for delaying the data output from the IFFT unit 12 by 2N, i.e., the number of effective data.

If the IFFT processed data from the IFFT unit 12 are serially fed into the cyclic extension adder 14, a part of the data to be copied into the CP is later than its inserting position and thus the previous input data must be stored before an input of this data.

The number of data to be stored is 2N, and 2N buffers are required to store the data.

The buffers 141, 143 and 145 are under the control of a logical product circuit 147 for performing a logical product determination on clock and enable signals.

It is multiplexer 149 that adds the CP's to the output data of the IFFT unit 12.

Data output from the IFFT unit 12 and directly fed into the 0'th pin of the multiplexer 149 are earlier by one DMT symbol than those delayed via the buffers 141, 143 and 145 and fed into the l'th pin. So, the CP's can be inserted into the data by controlling the output of the multiplexer 149.

SUMMARY OF THE INVENTION

The above-described prior art is however disadvantageous in that additional hardware is required for inserting the ending part of the individual DMT symbol into the leading part of it in order to realize the CP's at the cyclic extension adder 14 of the transmitter 10 in the VDSL system, which incurs a delay and makes it harder to transfer signals accurately.

It is therefore an object of the present invention to solve the problem and to provide a zipper type VDSL system using CS's alone to reduce hardware complexity, i.e., memory and delay required to realize the CP's.

To achieve the object, the present invention is characterized in that instead of using the CP, the CS is extended to have a conventional function of both CP and CS.

In accordance with the present invention, there is provided a zipper type Very high bit-rate Digital Subscriber Line (VDSL) system which comprises a transmitter including an inverse fast Fourier transformer for performing an inverse fast Fourier transform on input data, and a cyclic extension adder for adding a cyclic extension for each symbol to the data output from the inverse fast Fourier transformer and outputting the data to a transmission channel; and a receiver including a cyclic extension remover for removing the cyclic extension from the data received through the transmission channel, and a fast Fourier transformer for performing a fast Fourier transform on the data output from the cyclic extension remover. The cyclic extension adder copies a first predetermined number of data starting from the leading part of the input symbol data received from the inverse fast Fourier transformer into a first cyclic suffix for removing interference between symbols and maintaining orthogonality between sub-carriers; adds the first cyclic suffix to the end of the symbol data; copies a second predetermined number of data subsequent to the first predetermined number of data into a second cyclic suffix for maintaining orthogonality between upstream and downstream; and adds the second cyclic suffix to the end of the first cyclic suffix.

The cyclic extension remover removes the first predetermined number of data and data corresponding to the second cyclic suffix from the leading part of the symbol data received from the transmission channel. And, the fast Fourier transformer compensates the data output from the cyclic extension remover for a phase shift caused by the second cyclic suffix.

The compensation of the data output from the cyclic extension remover for phase shift caused by the second cyclic suffix is performed by, if not limited to, a frequency domain equalizer.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
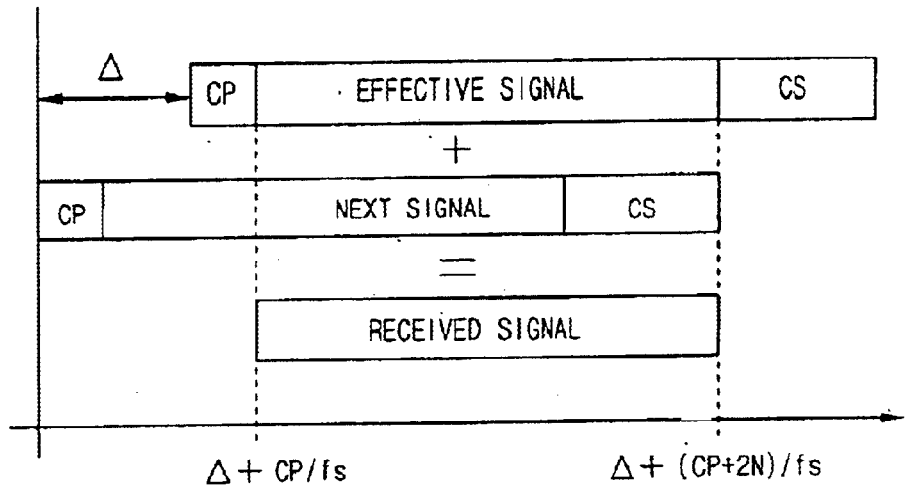
FIG. 1 is a diagram for explaining the effect of a CS in the conventional zipper type VDSL system.
Figure 2:
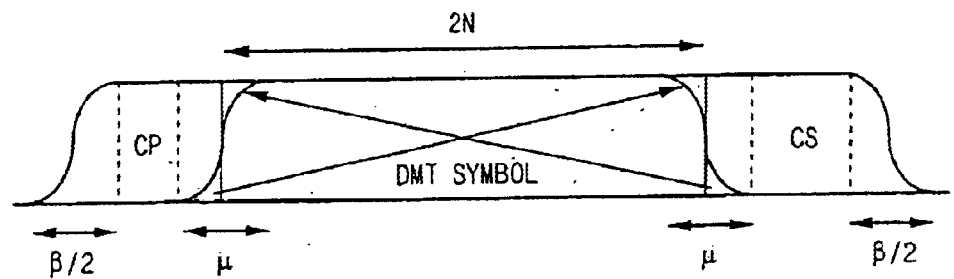
FIG. 2 is a diagram for explaining pulse shaping and windowing functions for a DMT symbol used in the conventional zipper system.
Figure 3:
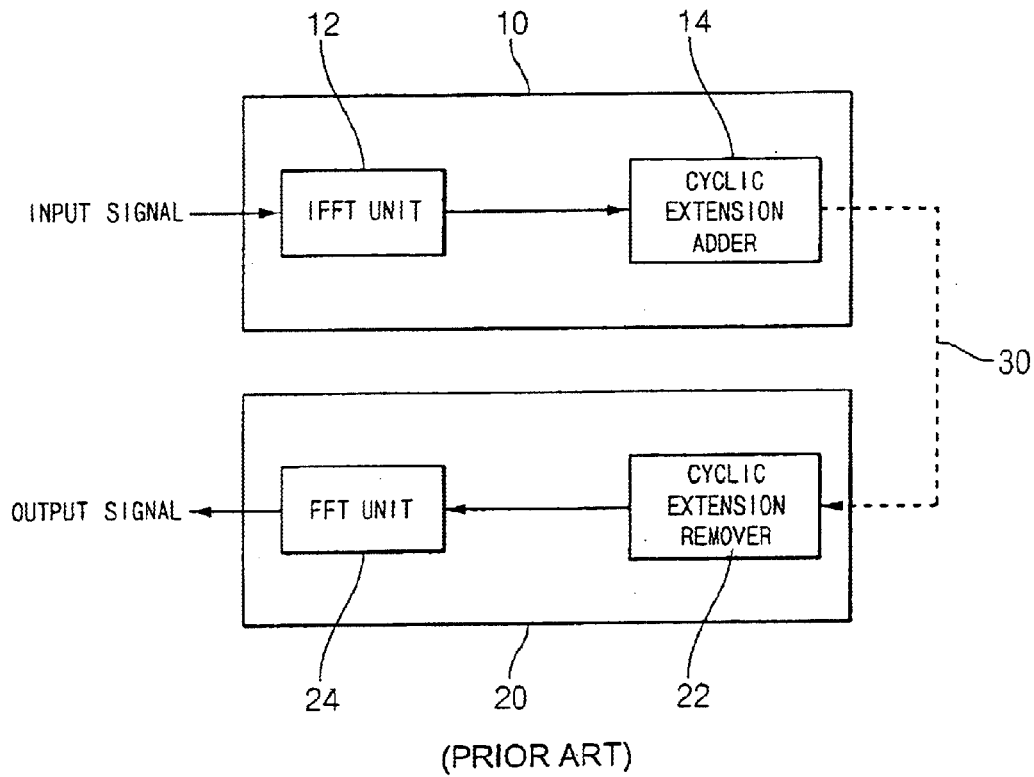
FIG. 3 is a block diagram of a general zipper type VDSL system.
Figure 4:
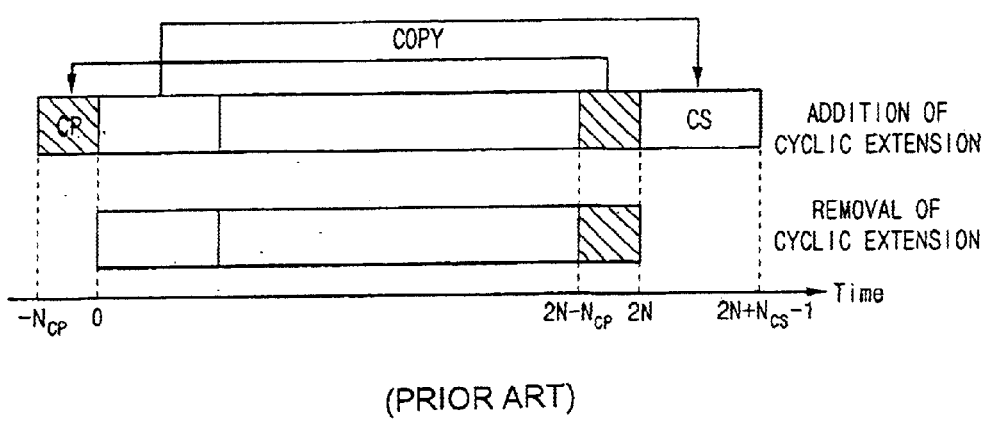
FIG. 4 is a diagram for explaining a process for inserting and removing a cyclic extension in the conventional zipper type VDSL system.
Figure 5:
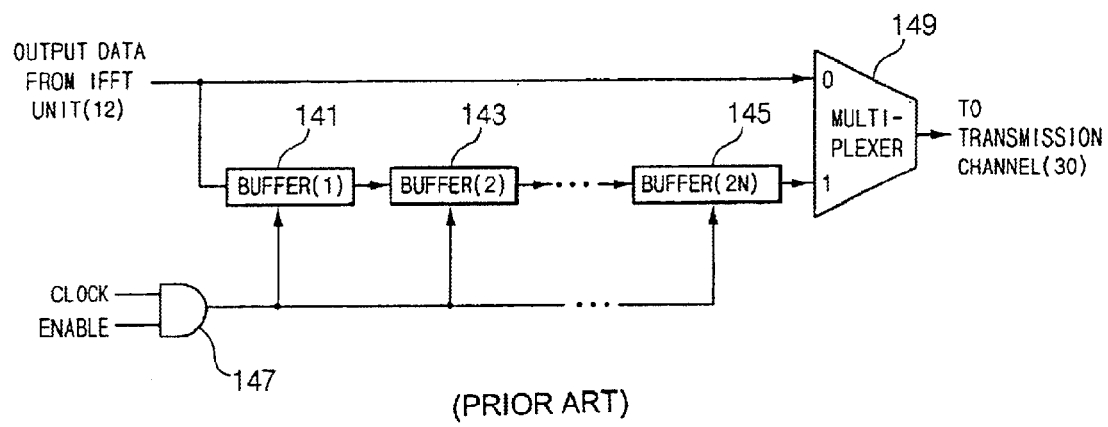
FIG. 5 is a block diagram of a CP adding unit in the cyclic extension adder of the conventional zipper type VDSL system.
Figure 6:
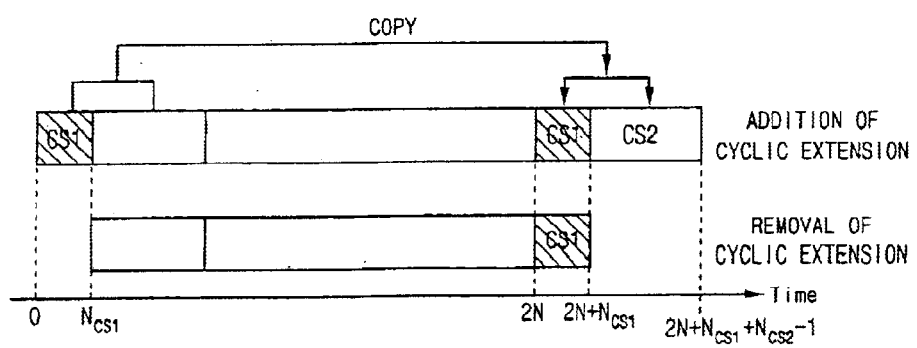
FIG. 6 is a diagram for explaining a process for inserting and removing a cyclic extension in a zipper type VDSL system in accordance with the embodiment of the present invention.

FIG. 6 illustrates a process for insertion and removal of a cyclic extension in a zipper type VDSL system according to the embodiment of the present invention.

As shown in FIG. 6, the cyclic extension is inserted in the zipper type VDSL system in such a manner that the leading part ($N_{CS1}+N_{CS2}$ data) of a DMT symbol is copied into the protected interval of the ending part.

CS1 acts as the CP of the conventional VDSL system to remove interference between DMT symbols and maintain orthogonality between sub-carriers, and CS2 acts as the CS of the conventional VDSL system to maintain orthogonality between upstream and downstream and eliminate an effect of the NEXT.

In the zipper type VDSL system according to the embodiment of the present invention, the I'th DMT signal transmitted on a channel from transmitter 10 is expressed by:

$$\hat{x}_l(\hat{n}) = \frac{1}{\sqrt{2N}} \sum_{k=0}^{2N-1} X_l(k) e^{\frac{j2\pi kn}{2N}}$$

Here, $\hat{n}=0, 1, 2, \ldots, 2N+N_{CS1}+N_{CS2}-1$.
The signal then received at receiver 20 via the channel is expressed by the following equation containing a timing offset as in the conventional VDSL system:

$$\hat{y}_l(\hat{n}) = \frac{1}{\sqrt{2N}} \sum_{k=0}^{2N-1} X_l(k) H_l(k) e^{\frac{j2\pi k(\hat{n}+\delta)}{2N}} + \hat{w}_l(\hat{n})$$

The CP region in the leading protected interval is damaged by the previous symbol in the conventional system, whereas the effective data region is damaged in the present invention system. However, as the same data are copied into the ending part of the symbol in inserting the protected interval at the transmitter 10, the copied CS1 region is hardly affected by the previous symbol after passing through the channel. Accordingly, the receiver 20 removes $N_{CS1}$ samples of the damaged leading part of the symbol other than the ending one in removing the protected interval, thus reserving the undamaged data at the ending part of the symbol. The removed signal of $N_{CS1}$ samples of the damaged leading part is then expressed by:

$$\hat{y}(n+N_{CS1}) = \frac{1}{\sqrt{2N}} \sum_{k=0}^{2N-1} X_l(k) H_l(k) e^{\frac{j2\pi k(n+N_{CS1}+\delta)}{2N}} + \hat{w}_l(n+N_{CS1})$$

In this case, unlike the conventional system, the removed signal of the protected interval contains a time domain index starting from the size of the protected interval, i.e., $N_{CS1}$ and reserves the original data of the leading part in the CS1 region of the ending one.

Consequently, the removed signal of the protected interval of the leading part and the CS2 by the receiver 20 has effective data cyclically shifted by $N_{CS1}$ samples, as opposed to the conventional system. That is, due to the attribute of the FFT that a cyclic shift in the time domain appears as a linear shift in the frequency domain, the signal demodulated at FFT unit 24 has a phase shift as follows:

$$\hat{Y}_l(k) = \frac{1}{\sqrt{2N}} \sum_{k=0}^{2N-1} \hat{y}_l(n+N_{CS1}) e^{\frac{-j2\pi nk}{2N}}$$

$$= X_l(k) H_l(k) e^{\frac{j2\pi(N_{CS1}+\delta)}{2N}} + \hat{w}_l(k)$$

Thus the signal according to the embodiment of the present invention is phase-shifted by $\theta(k)$, as opposed to the signal demodulated by the conventional method as represented by the equation (1), and the relationship between the two equations in this case is given by:

$$\hat{Y}_l(k) = \tilde{Y}_l(k) e^{\frac{j2\pi N_{CS1}k}{2N}}$$

$$= \tilde{Y}_l(k) \theta(k)$$

The phase shift $\theta(k)$ caused by the CS1 is expressed as the function of the subchannel index k and linearly increases with an increase in the subchannel index k.

Such a phase shift is undesired and can be compensated for without any additional hardware by using a frequency domain equalizer that controls attenuation of the respective subchannels and delay of signals demodulated at the FFT unit 24.

That is, it is unnecessary to perform a separate estimation of the phase shift because the estimated channel value determined by using a training symbol includes phase shifts caused by both channel and CS1.

Therefore, the phase shift is simultaneously compensated when the coefficient is determined using the estimated channel value.

This may be well understood by the following equation:

$$\hat{H}(k) = \frac{\hat{Y}_P(k)}{X_P(k)}$$

$$= H_P(k)e^{\frac{j2\pi N_{CS1}k}{2N}} + W'_p(k)$$

$$= H_P(k)\theta(k) + W'_P(k)$$

Here, $\hat{H}(k)$ represents the frequency response of the estimated channel for the training time, $X_P(k)$ the training symbol transmitted in the frequency domain, and $\hat{Y}_P(k)$ the received symbol.

As the estimated channel value includes the term $\theta(k)$, it can be used to compensate for the phase shift caused by the CS1.

That is, supposing that noises are negligible with no change in the channel between the training symbol and the l'th transmitted symbol, the received signal is given by the following equation:

$$\hat{X}_l(k) = \frac{\hat{Y}_l(k)}{\hat{H}(k)}$$

$$= \frac{H_l(k)X_l(k)e^{\frac{j2\pi N_{CS1}k}{2N}} + \hat{W}_l(k)}{H_P(k)e^{\frac{j2\pi N_{CS1}k}{2N}} + W'_P(k)} \approx X_l(k)$$

As seen from the equation, the embodiment of the present invention automatically compensates for the phase shift caused by the CS1 by means of the frequency domain equalizer using a training symbol without a separate estimation stage, which allows estimation of the transmission signal in a similar way to the conventional method.

Figure 7:
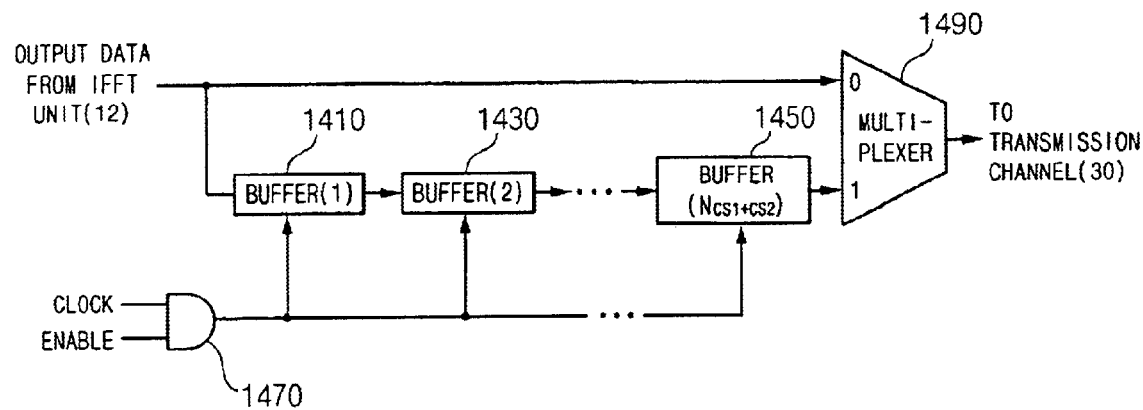
FIG. 7 is a block diagram of a CP adding unit in the cyclic extension adder of the zipper type VDSL system in accordance with the embodiment of the present invention.

FIG. 7 is a block diagram of a CS1 and CS2 adding unit in the cyclic extension adder 14 of the zipper type VDSL system in accordance with the embodiment of the present invention.

As illustrated in FIG. 7, the CS1 and CS2 adding unit in the cyclic extension adder 14 includes $N_{CS1+CS2}$ buffers 1410, 1430 and 1450 for delaying data by N and storing $N_{CS1+CS2}$ data to as many as the total number of CS1's and CS2's from the leading part of the data output from the IFFT unit 12.

If the IFFT processed data from the IFFT unit 12 are serially fed into the cyclic extension adder 14, the first $N_{CS1}$ and $N_{CS2}$ data are stored in the buffers 1410, 1430 and 1450 and, after the last data of the DMT symbol is output, the data are output from the buffers 1410, 1430 and 1450 to constitute CS1 and CS2.

Buffers 1410, 1430 and 1450 are under the control of a logical product circuit 1470 for performing a logical product determination on clock and enable signals.

It is multiplexer 1490 that has the function of adding the CS1 and CS2 to the output data of the IFFT unit 12.

Among the output data of the IFFT unit 12 directly fed into the multiplexer 1490, the first $N_{CS1+CS2}$ data are input to both the 0'th pin of the multiplexer 1490 and the buffers 1410, 1430 and 1450, and the subsequent data input to the buffers 1410, 1430 and 1450 are not stored.

As described above, the hardware complexity and output delay increase proportional to the size of the effective data 2N in the conventional system using both CP and CS, whereas they increase proportional to the size of the cyclic extension $N_{CS1}+N_{CS2}$ in the present invention system. Thus the hardware complexity is greatly reduced so as to cause no delay in this system.

Table 2 compares the conventional system with the present invention system with respect to hardware, in regard to buffer size, as well as latency. As can be seen from Table 2, the present invention system is much more effective in hardware and latency than the conventional one.

TABLE 2

Comparison of two systems in hardware and latency

|  | Prior art (CP + CS) | Present invention (CS1 + CS2) |
| --- | --- | --- |
| Buffer size | 2N | |
| Delay | 2N | |
| Latency | $\Delta + (2(2N + N_{CP}) + N_{CS})/f_S$ | $\Delta + (2N + N_{CP} + N_{CS})/f_S$ |

EXAMPLE

For performance evaluation of the VDSL system, channel environments were taken into consideration, for example additive white Gaussian noise (hereinafter referred to as "AWGN), NEXT, far-end crosstalk (hereinafter referred to as "FEXT") and RFI noises.

Each power spectral density (hereinafter referred to as "PSD") of the NEXT and FEXT is given by the following equations:

$$PSD_{NEXT} = PSD_{disturber} \cdot (N/49)^{0.6} \cdot 8.818 \times 10^{-14} \cdot f^{1.5}$$

$$PSD_{FEXT} = PSD_{disturber} \cdot |H(f)|^2 \cdot (N/49)^{0.6} \cdot 7.999 \times 10^{-20} \cdot d \cdot f^2$$

Here, N represents the number of subscribers causing crosstalk, f the frequency, d the length of the channel, H(f) the frequency response of the channel.

Figure 8:
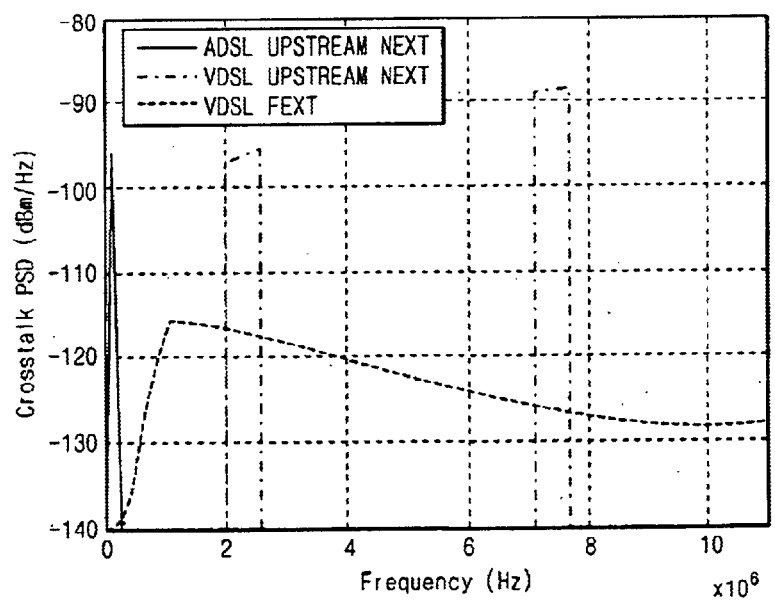
FIG. 8 shows the power spectral densities of near-end crosstalk (NEXT) and far-end crosstalk (FEXT) in the embodiment of the present invention, wherein NEXT noises include those of ADSL or VDSL systems.

FIG. 8 shows PSD's of the NEXT and FEXT used in this example, in which the NEXT noise includes those generated in ADSL or VDSL systems.

For the VDSL upstream NEXT, $PSD_{disturber}$ of −60 dBm/Hz was used in the upstream bands of 2.0 to 2.6 MHz and 7.1 to 7.65 MHz at an asymmetric bit rate of 8:1. And, a VDSL power mask was used for the FEXT.

The RFI noise was generated by passing the white Gaussian noise through a tertiary butterworth low-pass filter with a cutoff frequency of 2 kHz and modulated it in the pass band.

Table 3 summarizes the parameters of the VDSL system used in this example.

TABLE 3

Parameters of VDSL system.

| | Prior art (CP + CS) | Present Invention (CS1 + CS2) |
|---|---|---|
| No. of sub-carriers | 2048 | 2048 |
| System margin | $\gamma_{margin}$ = 6 dB | $\gamma_{margin}$ = 6 dB |
| Coding gain | $\gamma_{code}$ = 3 dB | $\gamma_{code}$ = 3 dB |
| SNR-gap | $\Gamma$ = 9.8 dB | $\Gamma$ = 9.8 dB |
| Sampling frequency | 22.08 MHz | 22.08 MHz |
| Used bandwidth | 300 kHz–11.04 MHz | 300 kHz–11.04 MHz |
| Cable type | TP1 | TP1 |
| Length of CP | 100 samples | 0 sample |
| Length of CS | 220 samples (2000 m) | 320 samples (2000 m) |
| Background noise | AWGN (−140 dBm/Hz), NEXT, FEXT, and RFI | AWGN (−140 dBm/Hz), NEXT, FEXT, and RFI |

For a synchronous mode, the length of the CP was 100 samples with the maximum length of the CS being 220 samples based on the channel length of 2000 m in consideration of the channel delay in the prior art system, whereas the length of the CS1 was 100 samples and that of the CS2 was 220 samples in the system according to the embodiment of the present invention in order to evaluate the performance under the same conditions. That is, the present invention system used noCP's but 320 CS's.

For an asynchronous mode, the length of the CS was varied depending on a given channel delay, which usually depends on the length of the individual channels.

The signal to noise ratio (hereinafter referred to as "SNR") gap had a bit error rate (hereinafter referred to as "BER") of $10^{-7}$ and the noises included 20-ADSL NEXT, 25-VDSL NEXT, 20-VDSL FEXT, and RFI.

The center frequency of the RFI was 1.89 MHz, 1.92 MHz, 3.53 MHz, 3.69 MHz, 3.90 MHz, 7.03 MHz, 7.07 MHz, or 7.10 MHz.

Figure 9A:
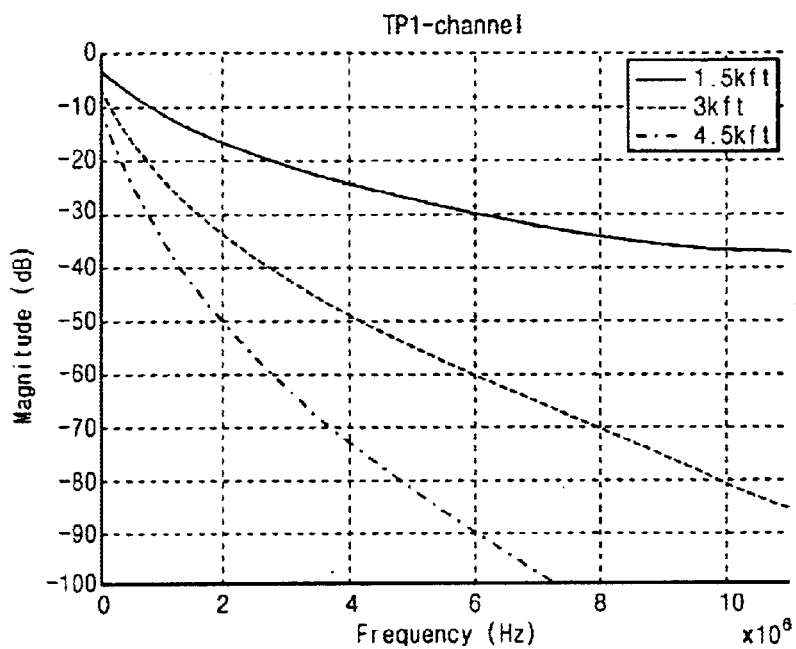
FIG. 9 shows an insertion loss in the frequency domain (FIG. 9a) and an impulse response in the time domain (FIG. 9b) for TP1 channels (1.5 kft, 3 kft and 4.5 kft) used in the embodiment of the present invention.
Figure 9B:
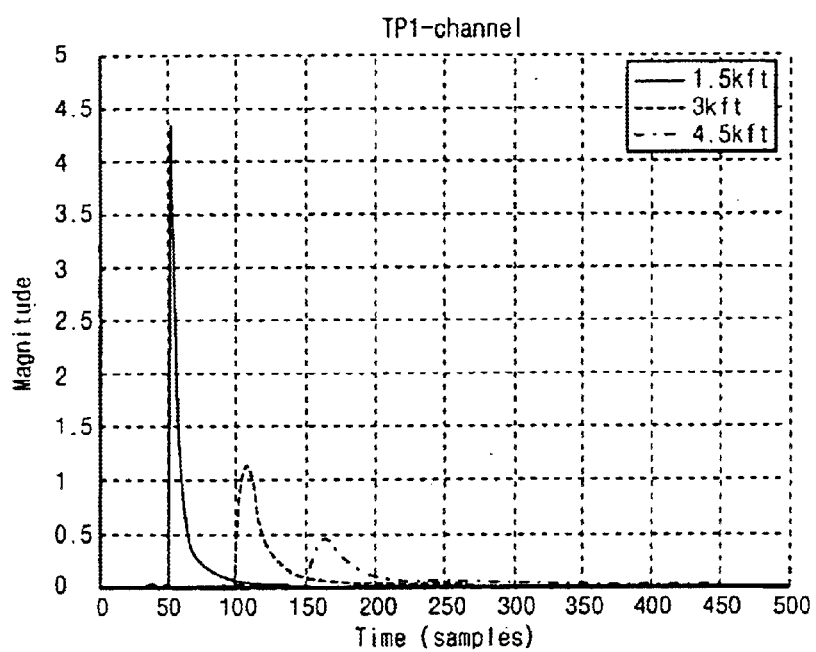

FIG. 9 shows an insertion loss in the frequency domain (FIG. 9a) and an impulse response in the time domain (FIG. 9b) for TP1 channels (1.5 kft, 3 kft and 4.5 kft) used in this example.

Figure 10:
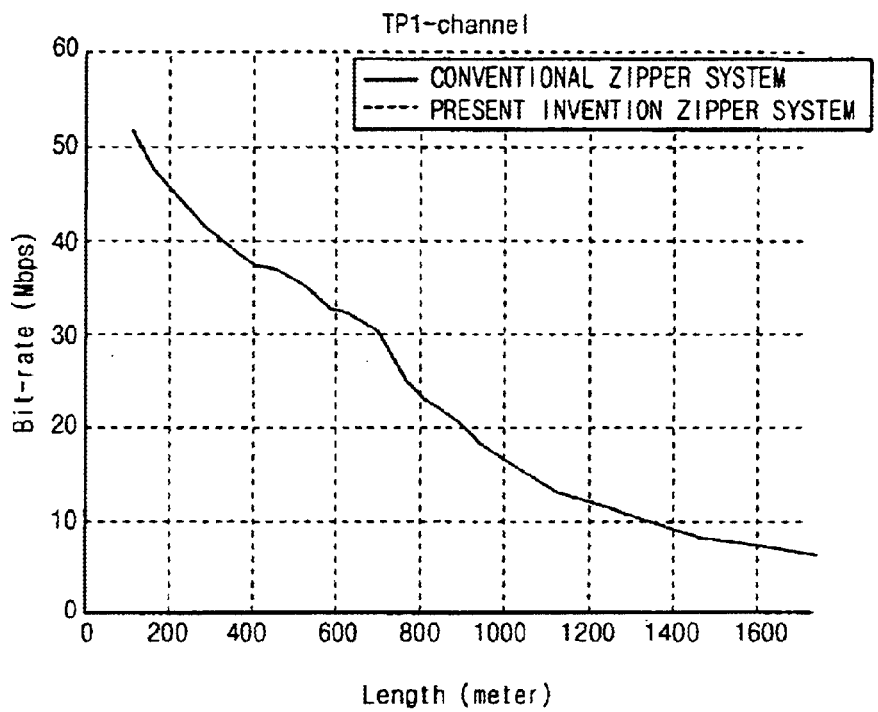
FIG. 10 shows a comparison of the prior art system using both CP and CS with the present invention system using CS alone in terms of transmission performance after bit allocation based on the signal-to-noise ratio (SNR) for TP1 channels containing additive white Gaussian noise (AWGN), NEXT and FEXT.

FIG. 10 compares the conventional system using both CP and CS with the present invention system using CS's alone in terms of transmission performance after bit allocation based on the SNR in a TP1 channel containing AWGN, NEXT and FEXT.

As is apparent from FIG. 10, the present invention system is almost similar in performance to the conventional one.

With no particular difference in performance between the two systems, the following description will be given as to the case of the present invention system.

Figure 11:
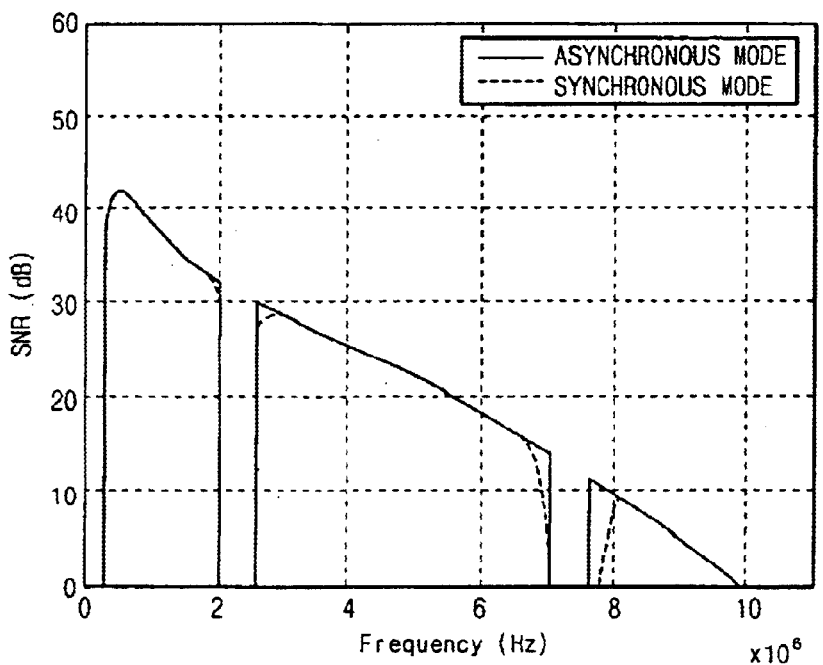
FIG. 11 shows a comparison between a synchronous mode and an asynchronous mode in regard to the SNR of the TP1-3 kft channel in using the system according to the embodiment of the present invention.
Figure 12:
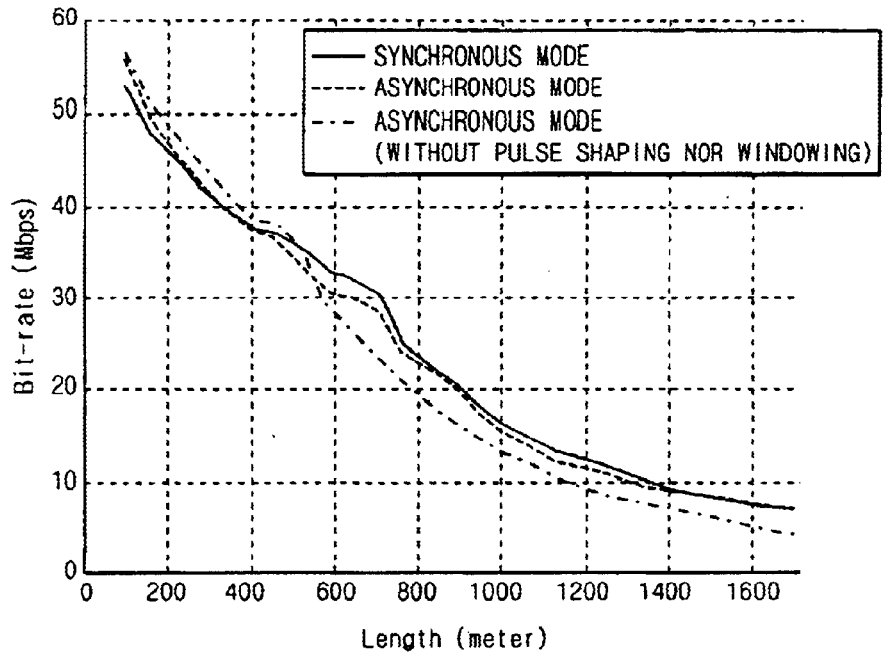
FIG. 12 shows a comparison between a synchronous mode and an asynchronous mode in regard to the transmission performance as a function of the distance in using the system according to the embodiment of the present invention.

FIG. 11 makes a comparison between the synchronous mode and asynchronous mode in regard to the SNR of the TP1–3 kft channel when using the system according to the embodiment of the present invention. FIG. 12 also compares the synchronous mode with the asynchronous mode in regard to the transmission performance of the TP1–3 kft channel as a function of distance.

In particular, FIG. 12 shows the transmission performance with a varying length of the channel in the two cases of the asynchronous mode using pulse shaping and windowing functions or not.

As shown in FIG. 12, the asynchronous mode using pulse shaping and windowing functions is much higher in performance than that when not using pulse shaping and windowing functions, and it appears similar in performance to the synchronous mode.

It is also seen from FIG. 12 that the performance of the asynchronous mode is higher in the shorter channel in which the NEXT is negligible due to the FEXT noise, and the length of cyclic extension can be smaller to enhance the efficiency.

FIG. 11 shows SNR's by the sub-carrier in the synchronous mode and the asynchronous mode using pulse shaping and windowing functions. As is apparent from FIG. 11, a loss of SNR scarcely appears in the asynchronous mode except for the edge part.

Figure 13:
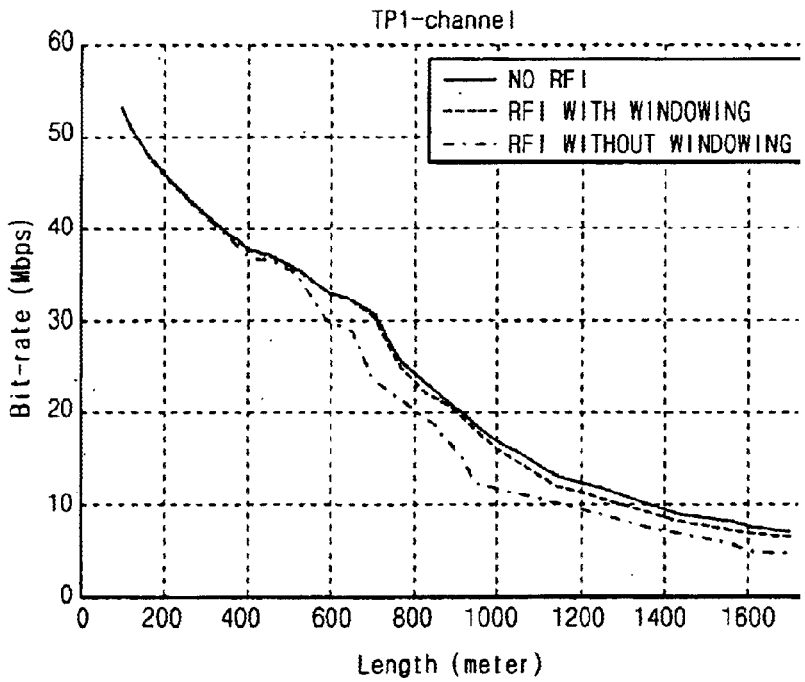
FIG. 13 shows the transmission performance of the zipper type VDSL system according to the embodiment of the present invention as a function of the length of a channel with RFI introduced therein.

FIG. 13 shows the transmission performance as a function of the length of channel containing the RFI noise in the zipper type VDSL system according to the embodiment of the present invention.

As shown in FIG. 13, the RFI noise has no significant effect on the transmission performance in the case of using the windowing function.

Table 4 shows the transmission performance and BER of the zipper type VDSL system according to the embodiment of the present invention under different environments.

TABLE 4

Transmission performance of zipper type VDSL system under different environments

| | | Downstream bit rate (Mbps) | | | |
|---|---|---|---|---|---|
| | RFI | 1 kft | 3 kft | 4.5 kft | BER $10^{-7}$ |
| Synchronous mode | X | 41.6 | 20.2 | 8.5 | 0 |
| | O | 41.6 | 19.4 | 7.8 | 0 |
| Asynchronous mode | X | 41.5 | 19.8 | 8.3 | 0 |
| | O | 41.5 | 19.0 | 7.7 | 0 |

A comparison of the conventional system with the present invention system in terms of hardware is given as follows.

The conventional system using both CP and CS requires 4096 buffers with a delay of 4096 samples, whereas the present invention system using the CS alone requires no more than 320 buffers causing no delay. Namely, using the system according to the embodiment of the present invention allows a great reduction of hardware size and delay relative to the case of using the conventional system.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, the cyclic extension system uses the CS alone to greatly reduce hardware size and delay, but nevertheless, it has the same transmission performance as the conventional system under normal channel environments.

Furthermore, the present invention system in the asynchronous mode employs pulse shaping and windowing functions so as to enhance the performance as in the synchronous mode.

What is claimed is:

1. A zipper type Very high bit-rate Digital Subscriber Line (VDSL) system which comprises a transmitter including an inverse fast Fourier transformer for performing an inverse fast Fourier transform on input data, and a cyclic extension adder for adding a cyclic extension for each symbol to the data output from the inverse fast Fourier transformer and outputting the data to a transmission channel; and a receiver including a cyclic extension remover for removing the cyclic extension from the data received through the transmission channel, and a fast Fourier transformer for performing a fast Fourier transform on the data output from the cyclic extension remover, wherein the cyclic extension adder copies a first predetermined number of data starting from the leading part of the input symbol data received from the inverse fast Fourier transformer into a first cyclic suffix for removing interference between symbols and maintaining orthogonality between sub-carriers; adds the first cyclic suffix to the end of the symbol data; copies a second predetermined number of data subsequent to the first predetermined number of data into a second cyclic suffix for maintaining orthogonality between upstream and downstream; and adds the second cyclic suffix to the end of the first cyclic suffix.

2. The zipper type VDSL system as claimed in claim 1, wherein the cyclic extension remover removes the first predetermined number of data and data corresponding to the second cyclic suffix from the leading part of the symbol data received from the transmission channel, wherein the fast Fourier transformer compensates the data output from the cyclic extension remover for a phase shift caused by the second cyclic suffix.

3. The zipper type VDSL system as claimed in claim 1, wherein symbol data provided with the first and second cyclic suffixes added by the cyclic extension adder and transferred through the transmission channel are expressed by:

$$\hat{x}_l(\hat{n}) = \frac{1}{\sqrt{2N}} \sum_{k=0}^{2N-1} X_l(k) e^{\frac{j2\pi kn}{2N}}$$

wherein $\hat{n}$ is $0, 1, 2, \ldots, 2N+N_{CS1}+N_{CS2}-1$, in which N is the number of sub-channels, $N_{CS1}$ is the first predetermined number, and $N_{CS2}$ is the second predetermined number.

4. The zipper type VDSL system as claimed in claim 3, wherein the symbol data fed into the cyclic extension remover through the transmission channel and containing a timing offset are expressed by:

$$\hat{y}_l(\hat{n}) = \frac{1}{\sqrt{2N}} \sum_{k=0}^{2N-1} X_l(k) H_l(k) e^{\frac{j2\pi k(n+\delta)}{2N}} + \hat{w}_l(\hat{n})$$

wherein $\delta$ is a normalized timing offset; and $H_l(k)$ is the I'th frequency response of the channel.

5. The zipper type VDSL system as claimed in claim 4, wherein after removal of the first predetermined number of data and data corresponding to the second cyclic suffix from the symbol data fed into the cyclic extension remover, the symbol data are expressed by:

$$\hat{y}(n+N_{CS1}) = \frac{1}{\sqrt{2N}} \sum_{k=0}^{2N-1} X_l(k) H_l(k) e^{\frac{j2\pi k(n+N_{CS1}+\delta)}{2N}} + \hat{w}_l(n+N_{CS1})$$

6. The zipper type VDSL system as claimed in claim 5, wherein the symbol data output from the cyclic extension remover and transformed at the fast Fourier transformer are expressed by:

$$\hat{Y}_l(k) = \frac{1}{\sqrt{2N}} \sum_{k=0}^{2N-1} \hat{y}_l(n+N_{CS1}) e^{\frac{-j2\pi nk}{2N}}$$

$$= X_l(k) H_l(k) e^{\frac{j2\pi(N_{CS1}+\delta)}{2N}} + \hat{w}_l(k).$$

7. The zipper type VDSL system as claimed in claim 1, wherein the cyclic extension adder comprises:

a multiplexer for receiving, at one terminal, the symbol data output from the inverse fast Fourier transformer;

a buffer unit for sequentially storing the first predetermined number plus the second predetermined number of data starting from the leading part of the symbol data output from the inverse fast Fourier transformer and generating them to another terminal of the multiplexer; and a logical product circuit for performing a logical AND operation on clock and enable signals to control the buffer unit, and generating the operation result to the buffer unit, wherein the multiplexer outputs one symbol data received at the one terminal, and then outputs the first predetermined number of data and the second predetermined number of data received at the other terminal as the first and second cyclic suffixes, respectively.

8. The zipper type VDSL system as claimed in claim 7, wherein the buffer unit comprises a third predetermined number of buffers, the third predetermined number being the sum of the first and second predetermined numbers.

9. The zipper type VDSL system as claimed in claim 2, wherein the compensation of the data output from the cyclic extension remover for phase shift caused by the second cyclic suffix is performed by a frequency domain equalizer.

* * * * *